United States Patent [19]
Benvenuti

[11] Patent Number: 5,193,828
[45] Date of Patent: Mar. 16, 1993

[54] DOLLY STRUCTURE FOR MERCHANDISE DISPLAY RACKS

[75] Inventor: Frank Benvenuti, Ville Mercier, Canada

[73] Assignee: Knape & Vogt Canada Inc., Etobicoke, Canada

[21] Appl. No.: 754,956

[22] Filed: Sep. 4, 1991

[30] Foreign Application Priority Data

Aug. 5, 1991 [CA] Canada .................................. 2048429

[51] Int. Cl.$^5$ ................................................ B62D 21/12
[52] U.S. Cl. ................................ 280/43.24; 16/19; 211/189; 280/43; 280/43.17; 280/79.11; 280/79.3; 296/21
[58] Field of Search ............. 280/43, 46, 43.17, 43.24, 280/47.131, 79.2, 79.11, 79.3, 79.7; 16/18 R, 19, 32, 34; 211/186, 189; 248/129; 296/21

[56] References Cited

U.S. PATENT DOCUMENTS

| | | | |
|---|---|---|---|
| 1,700,212 | 1/1929 | Arlt | 311/71 |
| 2,768,835 | 10/1956 | Hull | 280/43.24 |
| 2,816,675 | 12/1957 | Baker | 280/43 |
| 2,878,029 | 3/1959 | Dahmen | 280/43.17 |
| 3,156,318 | 11/1964 | Sorenson et al. | 182/139 |
| 3,404,884 | 10/1968 | Sorenson et al. | 248/129 |
| 3,856,148 | 12/1974 | Olinick | 211/189 |
| 3,888,943 | 6/1974 | Clement | 296/21 |
| 4,068,855 | 1/1978 | Hackett | 211/189 |
| 4,596,232 | 6/1986 | Dowding | 16/19 |
| 4,743,039 | 5/1988 | Ellis | 280/42 |
| 4,801,152 | 1/1989 | Elliot et al. | 280/47.34 |

Primary Examiner—Eric D. Culbreth
Attorney, Agent, or Firm—Foley & Lardner

[57] ABSTRACT

A dolly structure mounted at each end of a display rack is disclosed. It has, at each end of the rack, a pair of flat frames removably fixed to a vertical shelf post in a manner such that the two flat frames are aligned and coplanar. A pair of caster assemblies are mounted on the outer side members of the frames, outwardly of the base of the display rack. Each assembly has a caster which is movable between a low and a high position such as to allow lifting of the rack from the ground when it is intended to displace it.

12 Claims, 3 Drawing Sheets

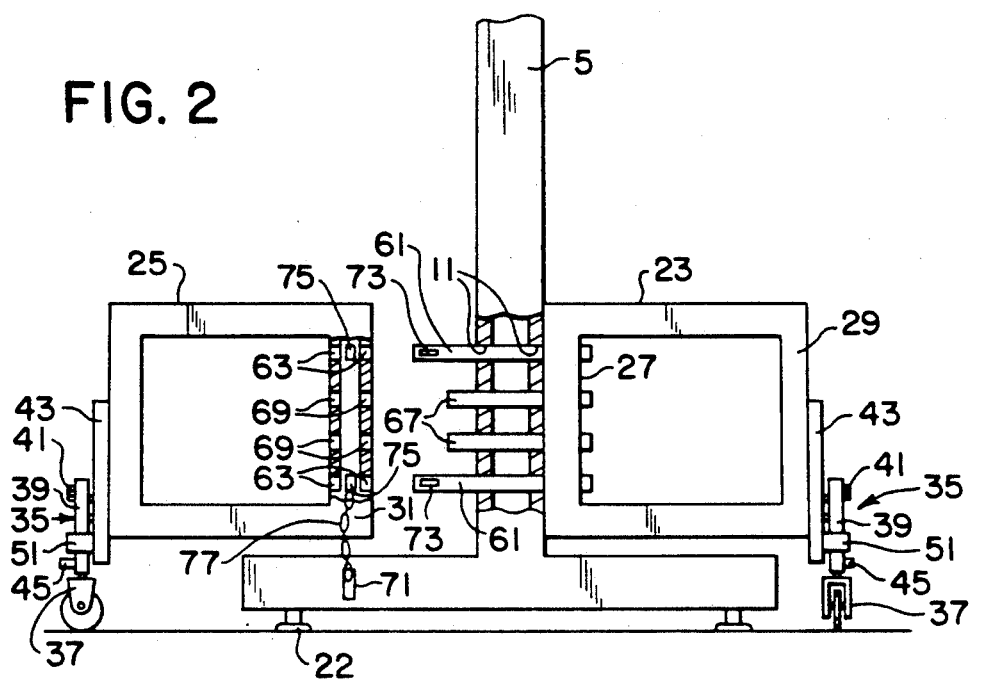
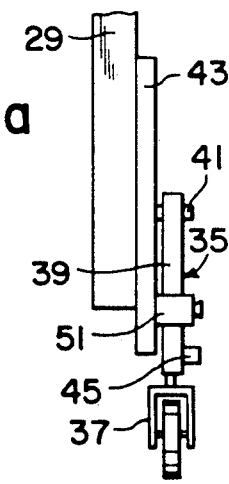
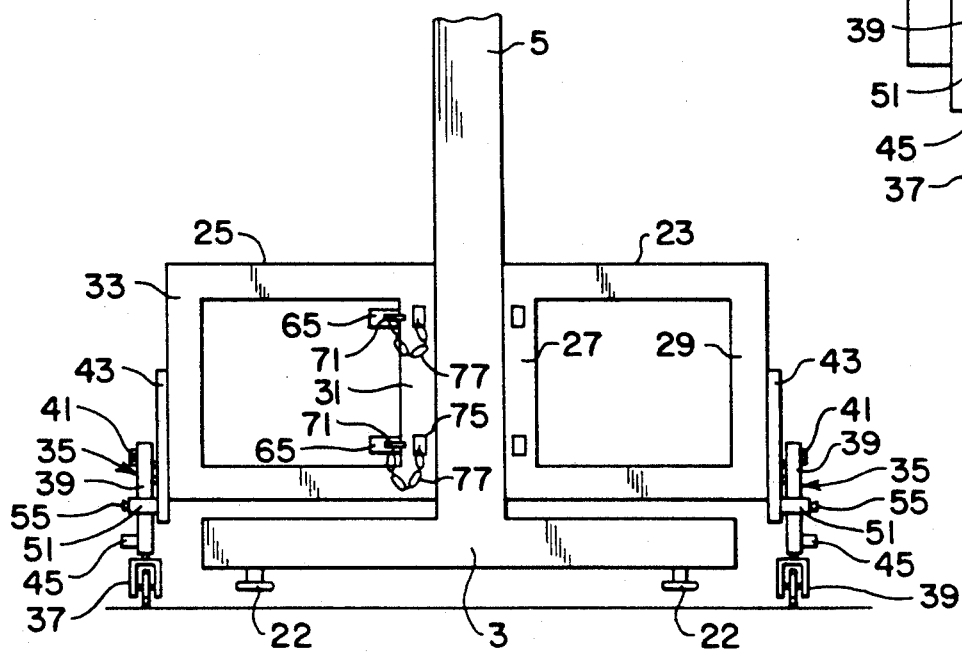

DOLLY STRUCTURE FOR MERCHANDISE DISPLAY RACKS

BACKGROUND OF THE INVENTION

1. Field of the invention

The present invention relates to a dolly structure for use in displacing a merchandise display rack or a like piece of furniture. It also relates to a display rack in combination with such a dolly structure.

2 Description of the Prior Art

A prior art search has revealed to Applicants the existence to U.S. Pat. No. 3,388,943 to CLEMENT which pertains to a merchandise display vehicle for use in an automobile service station. It has a base which is permanently mounted on a pair of central wheels so that the vehicle may be moved about whenever desired. For this purpose, the vehicle has a pulling handle at its lower end to the vehicle base and nestable in vertical position when not in use. A braking system prevents the central wheels from rotating when the vehicle is in the desired display location. A release mechanism connects the pulling handle to the braking system such that when the pulling handle is moved from its vertical position, for displacing the vehicle, it automatically releases the central wheels for rotation. Casters are also provided at either end of the base of the vehicle to ease in moving it about.

The problem with this arrangement is that the wheels, the casters and particularly the pulling handle are mounted permanently on the vehicle, which are constantly visible and would consequently be rather unsightly if the vehicle was to be used in a retail store where the dolly structure of the invention is particularly intended. In such retail stores, the merchandise display racks, known in the trade as "Gondolas", are disposed in island formation which has to be modified occasionally, therefore requiring that they be displaced. It is however essential, in this context that the whole dolly structure be entirely removable from the display rack.

The prior art search mentioned above has additionally revealed the following U.S. patents:
U.S. Pat. No. 1,700,212 of 1929
U.S. Pat. No. 3,156,318 of 1964
U.S. Pat. No. 4,743,039 of 1988
U.S. Pat. No. 4,801,152 of 1988

The above patents are less pertinent to the present invention than the CLEMENT patent analyzed above.

SUMMARY OF THE INVENTION

It is an object of the invention to provide a dolly structure capable of being mounted on a merchandise display rack, or the like, in an entirely removable manner so that the appearance of the display rack need not be affected after it is set in its new location.

Another object of the invention lies in the provision of a dolly structure which is simple in construction and easy to use.

Yet another object is in providing a dolly structure requiring very little effort in lifting the display rack and moving it about.

More specifically, the invention concerns, broadly, a dolly structure comprising a pair of flat bodies having inner and outer ends, connection means being provided for removably joining their inner ends so that they may be aligned and coplanar. Furthermore, a pair of caster assemblies are mounted on the bodies outer ends, which assemblies include casters movable between a high and a low position so that the said bodies may be raised and lowered.

In the preferred form, these flat bodies are flat frames and their ends are inner and outer side members of the frames.

Also according to a preferred embodiment, each caster assembly comprises: a caster lifting device which includes a first arm pivoted at one end to the outer side member of a relevant one of the frames, and a second arm solid with and projecting laterally from the other end of the first arm; this second arm being formed with a lever socket; means mounting one of the casters mentioned above on the second arm for swiveling motion; a lever capable of being inserted in the socket and usable to pivot the device between a vertical and an inclined position of the first arm so as to allow the relevant frame to be moved vertically as the caster is moved between its low and high positions. Finally, appropriate means releasably hold the device in this vertical position of the first arm. The latter means are preferably in the form of stirrup members fixed to the frame outer side members, being positioned and sized to allow the pivotable first arms of the lifting devices to move in and out of the stirrup members; locking means being provided for holding the first arms captive in the stirrup members when they are in their vertical position.

Other features and objects of the invention will become apparent from the description of a preferred embodiment having reference to the appended drawings.

DESCRIPTION OF THE DRAWINGS

FIG. 2 is an end view of the display rack of FIG. 1 with the dolly structure showing it being mounted thereon;

FIG. 2a is an enlarged view of a portion thereof;

FIG. 3 is a view similar to that of FIG. 2, illustrating the dolly structure completely mounted on the rack;

DESCRIPTION OF THE PREFERRED EMBODIMENT

Figure 1:
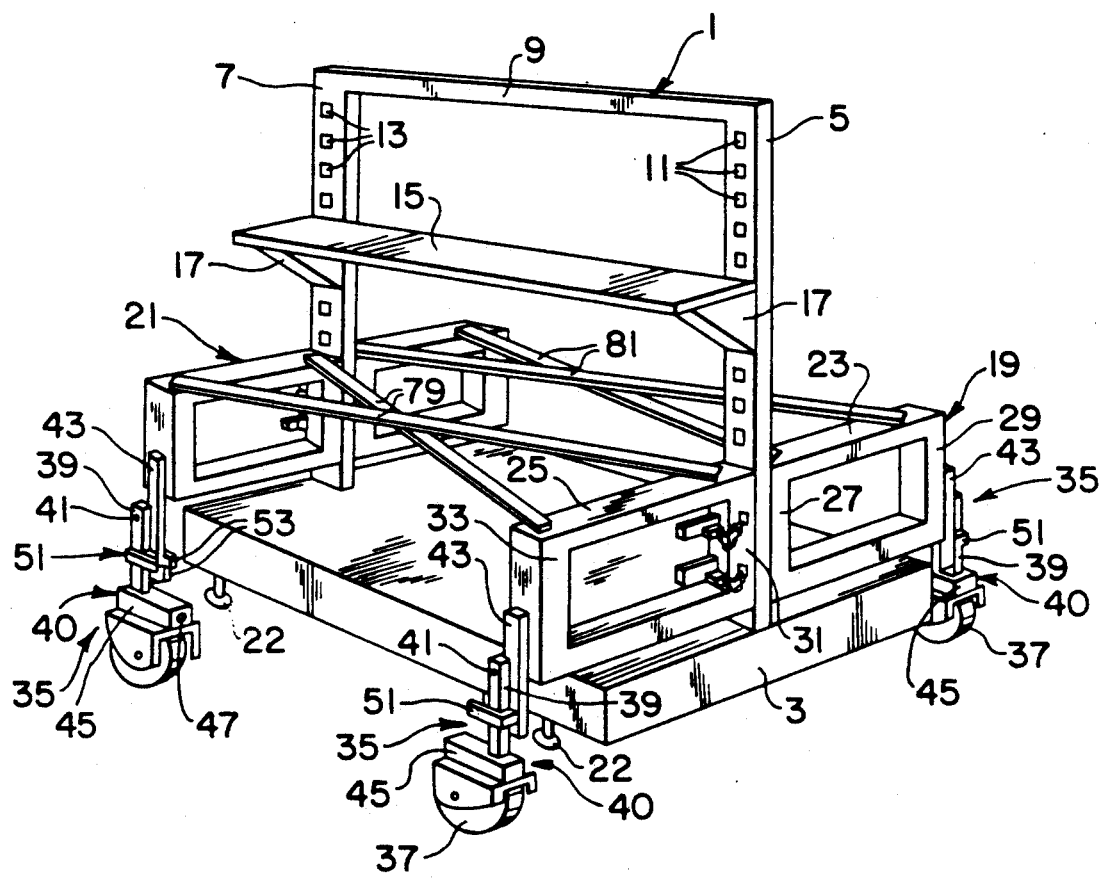
FIG. 1 is a diagrammatic perspective view of a merchandise display rack equipped with a dolly structure according to the invention.

Referring to FIG. 1, particularly, a conventional merchandise display rack is shown, made up of a rectangular horizontal base 3 having two shelf posts 5, 7 at the ends interconnected by horizontal cross bar 9. Posts 5, 7 are formed with elongated apertures 11, 13 that extend along their full length and that serve to secure merchandise shelves 15 through angular brackets 17, in known overhanging fashion. A wooden panel is often fixed between the posts 5, 7 and cross bar 9 but has not been shown for convenience in properly illustrating the dolly structures 19, 21. Where the display rack 1 has a certain, length, one or more intermediate posts, as for example illustrated 5, 7 may be found necessary, in which case additional dolly structures may be used. The display rack stands normally slightly above the floor through height-adjustable footed studs 22.

Since the dolly structures are identical, only the forward structure 19 is detailed hereinafter.

Broadly, this structure 19 comprises a pair of essentially flat bodies, preferably in the form of rectangular frames 23, 25 having inner ends or side members 27, 31 and outer ends or side members 29, 33. Connection means, described further on, are also provided that join the inner side members 27, 31 together so that the frames 23, 25 are held in alignment as well as in a common plane. Finally, the structure additionally includes a pair of like caster assemblies 35, mounted respectively on the outer side members 29 of the frame 23 and on the outer side member 33 of the frame 25, these assemblies including casters 37 movable between a low and a high position, as best shown in FIGS. 4 and 5, thus allowing the two frames 23, 25 to be vertically displaced.

According to the preferred embodiment shown, each caster assembly 35 is essentially made up of a generally L-shaped caster lifting device 40 having a first arm 39, pivoted by a pin 41 to an outer side member 29, 33 through a vertical square support bar 43 or, alternatively, directly to the outer side member 29, 33. The first arm 39 is spaced slightly away from the support bar 43, as shown in FIG. 2a, to allow for the presence of a stirrup member 51 referred to hereinafter. Each lifting device 40 also has a second arm 45 solid with and projecting laterally from the lower end of the first arm 39, being formed at its free end with a lever socket 47 for the reception of an operating lever bar 49 (FIGS. 4 and 5). The casters 37 may be of conventional type such as having a U-shaped strap into which a wheel is mounted for rotation; the strap being in turn mounted beneath the second arm 45 for swiveling motion about an axis parallel to the first arm 39 of the lifting device 40.

Figure 4:
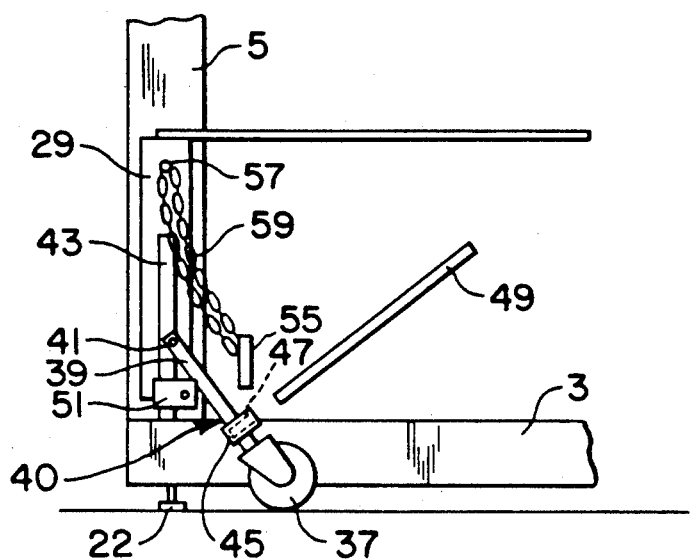
FIG. 4 is a side view of one corner of the rack of FIG. 3 showing the dolly structure in inoperative high position of the casters.
Figure 5:
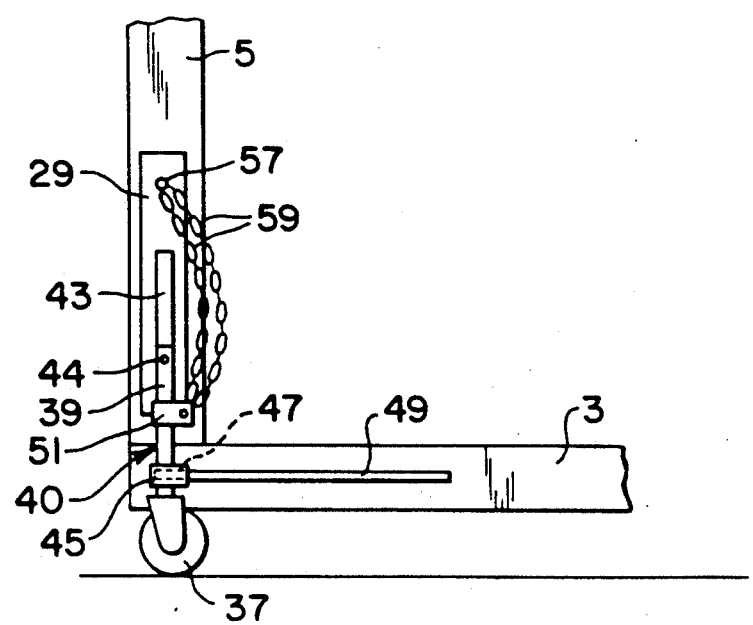
FIG. 5 is a similar view showing the dolly structure in operative low position of the casters for moving the display rack.

It is seen, from FIGS. 4 and 5, that the caster assemblies 35 (lifting devices 40, casters 37) can be moved between an inclined position (FIG. 4), with the display rack 1 resting on the floor and the casters in inoperative position, and an operative vertical position (FIG. 5) with the display rack 1 lifted off the floor so that it can easily be displaced. Means are provided for releasably holding the lifting devices 40 in such vertical position.

The said releasable holding means for each lifting device 40 comprise the aforementioned stirrup member 51 fixed by one of its side legs 53 (left in FIG. 1) to the support bar 43. It serves to receive the pivotable first arm 39 of the lifting device 40 when the latter is in vertical position, as in FIG. 5. In order to hold it in that position during displacement of the display rack, the two side legs 53 are provided, forwardly, with aligned holes suitable to receive a tapered locking pin 55 (FIG. 4). The latter is held by a string or chain 59 to a hook 57 of the outer side member 29 to prevent its loss when not in use. Thus, in the position of FIG. 5, the first arm 39 is held captive in the stirrup member 51.

Referring more particularly to FIG. 2, connection means are provided that join together the inner side members 27, 31 so that the frames 23, 25 are held in alignment and in a common plane, as aforesaid. As shown, prongs 61 project from the inner side member 27 of the frame 23, extend through apertures 11 of post 5 and have a length such as to extend also through apertures 63 of the inner side member 31 of the frame 25 and beyond, as in FIG. 3, where they form locking prong portions 65. Additional intermediate prongs 67 may be provided to extend through other apertures 11 of post 5 and through apertures 69 of the side members 31 but not beyond; serving only to join the frames 23, 25 more solidly to the post 5. Finally, the two frames are held firmly to the post 5 by two tapered locking pegs 71 removably extending through appropriate perforations 73 at the end of the prongs 61. To prevent the prongs from being lost, they may be attached to hooks 75 by strings or chains 77.

As shown in FIG. 1, the dolly structures 19, 21 should preferably include two sets of cross bars 79, 81 removably connected to the top of the frames 23, 25 to brace the whole construction. If more convenient, the cross bars can of course be mounted on the outer side members of the frames.

In the described embodiment, the caster lifting devices 40 pivot about an axis lying in the common plane of the frames 23, 25. It will be appreciated, however, that since the casters 37 are able to swivel by 360°, the lifting devices could be mounted to pivot about parallel axes normal to the frames, i.e. on the front faces of the frames.

What is claimed is:

1. A dolly structure comprising:
   a) a pair of essentially flat frames, each frame having an inner side member and an outer side member;
   b) connection means for removably joining said inner side members together to hold said frames in alignment and in coplanar relationship in a plane; and
   c) a pair of caster assemblies mounted on said outer frame members, respectively, said assemblies including casters movable between a low and a high position and so as to allow for vertically displacing said frames, wherein each of said caster assemblies comprises:
   a caster lifting device including a first arm and means pivoting one end of said first arm to the outer side member of a relevant one of said frames, and a second arm solid with an projecting laterally from the other end of said first arm, said second arm being formed at one end thereof, away from said first arm, with a level socket;
   means mounting one of said casters on said second arm for swiveling motion;
   a level insertable into said socket for pivoting said device between a vertical and an inclined position of said first arm whereby to displace said relevant frame vertically as said caster moves between said low and high positions; and
   means releasably holding said device in said vertical position.

2. A dolly structure as claimed in claim 1, wherein said releasable holding means of said devices comprise:
   stirrup members fixed to said frame outer side members, said stirrup members being positioned and sized to allow said pivotable first arms of said lifting devices to move in and out of the said stirrup members; and
   locking means for holding said first arms captive in said stirrup members when said first arms are in said vertical position.

3. A dolly structure as claimed in claim 2, wherein said first arms pivot means comprise:
   support bars, each solid with and depending down from one of said frames outer side members;
   pivot pins, each mounting one end of said first arms on one of said support bars; and
   wherein said stirrup members each have one leg secured to one of said support bars.

4. A dolly structure as claimed in claim 3, wherein said first arms of said lifting devices are pivotable about axes lying in the plane of said frames when said frames are aligned and coplanar.

5. A dolly structure as claimed in claim 1, wherein said first arms of said lifting devices are pivotable about axes lying in the plane in which said frames are held when said frames are aligned and coplanar.

6. The combination of a display rack with a dolly structure, said display rack comprising a horizontal base and shelf post solid with and rising from said base, said post being formed with spaced first transverse apertures, said dolly structure comprising:
a) a pair of essentially flat frames, each frame having an inner side member and an outer side member;
b) connection means for removably joining said inner side members together to hold said frames in alignment and in coplanar relationship in a plane;
c) a pair of caster assemblies mounted on said outer frame members respectively, said assemblies including casters movable between a low and a high position and so as to allow for vertically displacing said frames, and
d) at least one pair of spaced prongs solid with and projecting from the inner side member of one of said frames, said prong being coplanar with said one frame;

wherein the inner side member of the other of said frames is formed with second apertures spaced apart for registering with said first transverse apertures;

wherein said prongs extend through said first and second apertures and the length thereof is selected for them to project from said second apertures to define locking prong portions; and wherein means are provided which cooperate with said locking prong portions to secure said frames to said shelf post.

7. A combination as claimed in claim 6, wherein said locking prong portions are formed with locking perforations and said cooperating means are locking pegs extending through said locking perforations.

8. A combination as claimed in claim 6, wherein each of said caster assemblies comprises:

a caster lifting device including a first arm and means pivoting one end of said first arm to the outer side member of a relevant one of said frames, and a second arms solid with and projecting laterally from the other end of said first arm, said second arm being formed at one end thereof, away from said first arm, with a lever socket;

means mounting one of said casters on said second arm for swiveling motion;

a lever insertable into said socket for pivoting said device between a vertical and an inclined position of said first arm whereby to displace said relevant frame vertically as said caster moves between said low and high positions; and means releasably holding said device in said vertical position.

9. A combination as claimed in claim 8, wherein said releasable holding means of said devices comprise:

stirrup members fixed to said frame outer side members, said stirrup members being positioned and sized to allow said pivotable first arms of said lifting devices to move in and out of the said stirrup members; and locking means for holding said first arms captive in said stirrup members when said first arms are in said vertical position.

10. A combination as claimed in claim 9, wherein said first arms pivot means comprise:

support bars, each solid with and depending down from one of said frames outer side members;

pivot pins, each mounting one end of said first arms on one of said support bars; and wherein said stirrup members each have one leg secured to one of said support bars.

11. A combination as claimed in claim 10, wherein said first arms of said lifting devices are pivotable about axes lying in the plane in which said frames are held when said frames are aligned and coplanar.

12. A combination as claimed in claim 8, wherein said first arms of said lifting devices are pivotable about axes lying in the plane in which said frames are held when said frames are aligned and coplanar.

* * * * *